US006639010B2

(12) United States Patent
Bode

(10) Patent No.: US 6,639,010 B2
(45) Date of Patent: Oct. 28, 2003

(54) ELASTIC, THIXOTROPIC ORGANO-MINERAL SYSTEMS

(75) Inventor: Harald Bode, Dortmund, DE (US)

(73) Assignee: Minova International Limited, Witan Way Witney (GB)

( * ) Notice: Subject to any disclaimer, the term of this patent is extended or adjusted under 35 U.S.C. 154(b) by 0 days.

(21) Appl. No.: 10/183,346

(22) Filed: Jun. 28, 2002

(65) Prior Publication Data

US 2003/0073766 A1 Apr. 17, 2003

Related U.S. Application Data

(63) Continuation of application No. 09/446,923, filed as application No. PCT/GB98/01907 on Jun. 30, 1998, now abandoned.

(30) Foreign Application Priority Data

Jul. 2, 1997 (DE) ......................... 197 28 252

(51) Int. Cl.[7] .................................. C08K 3/34
(52) U.S. Cl. .................. 524/791; 524/612; 524/590; 524/494; 524/186
(58) Field of Search ................ 524/186, 494, 524/590, 612, 791

(56) References Cited

U.S. PATENT DOCUMENTS 4,105,594 A * 8/1978 Dieterich et al. ............ 521/100
4,142,030 A * 2/1979 Dieterich et al. ............ 521/100
4,307,980 A * 12/1981 Meyer et al. ................ 166/295
4,447,561 A * 5/1984 Horn et al. ............. 252/182.14
4,827,005 A    5/1989 Hilterhaus
4,871,829 A   10/1989 Hilterhaus
5,374,448 A   12/1994 von Bonin

FOREIGN PATENT DOCUMENTS

DE    29 08 746 A    9/1980
EP    0 099 531      2/1984

OTHER PUBLICATIONS

Database WPI, Section Ch, Week 9251, Derwent PublicationsLtd. and JP 04 318096, Nov. 9, 1992.

* cited by examiner

Primary Examiner—Cephia A. Toomer
(74) Attorney, Agent, or Firm—Nixon & Vanderhye P.C.

(57) ABSTRACT

A method is provided for the manufacture of elastic, fire resistant, organo-mineral systems based on water-glass in which, to the water-glass, compounds, having terminal amino groups are added, in which at least one free hydrogen atom on at least one amino group and at least one alkylene group interrupted by one oxygen and/or sulphur atom are present as well as the products and the two component systems which can be obtained therewith. The later can be applied in mining for filling and/or agglutination of anchors.

9 Claims, No Drawings

ELASTIC, THIXOTROPIC ORGANO-MINERAL SYSTEMS

This application is continuation of application Ser. No. 09/446,923 now abandoned, filed Dec. 30, 1999, which in turn was the US national phase of international application PCT/GB98/01907 filed Jun. 30, 1998 which designated the U.S.

A method for the manufacture of elastic, thixotropic organo-mineral systems, the products obtained therewith and their application.

In the field of mining and particularly for application underground, anchoring and fastening systems play a special part. The present invention therefore concerns a method for the manufacture of an organo-mineral system with which bore holes can be filled and anchors can be agglutinated. The substances according to the invention which may be used for this purpose possess advantageous properties.

Inflammability is of importance, especially for underground applications for anchoring and agglutinating systems. PU systems, polyurethane systems as well as the known polyester resin systems are flammable and during hardening develop a strong smell and gases which may be damaging to health. Epoxy resin systems which are in use at the present time are not sufficient to meet these requirements. The synthetic resins named above do however find application because until now it has not been possible to prepare a rapid setting anchor fastening system for overhead application, which can be injected into an overhead bore hole by means of a two component processing plant, without the material flowing out again. Also, apart from high strength, elasticity is also desirable so that the resin can accommodate possible roof movement.

WO A-94/04588 and/or DE-A-42 28 178 disclose primary and secondary amines as polymerising agents for the manufacture of polyurethane synthetic resins. Furthermore it is known that organo-mineral systems do not burn well and harden to form brittle-hard resins. Such an organo-mineral system, namely a water-glass/isocyanate system is described in EP-A-0 167 002. It is known that only a few materials dissolve in water-glass and/or can be emulsified therein. These are primarily short chained diols and triols. If one now adds to the A component diols and/or triois according to EP-A-0 167 002, then the elasticity of the product is not increased to any measurable extent. On the contrary an heterogeneous product is obtained because the reaction rate between water-glass and isocyanate and diol/triol is variable. A multi phase resin is obtained. If one uses on the isocyanate side a pre-polymer then an elastic resin will form at first but which will however become brittle after a few days.

It is an objective of the present invention to overcome the disadvantages to which the substances tend which are described in the state of the art and to prepare a material which is not flammable, which hardens rapidly, possesses thixotropic properties and can be processed in a machine as a two component system. After hardening, the material should exhibit a residual elasticity, which should be ecologically and toxicologically unobjectionable and if possible should be capable of being manufactured in a cost effective manner.

This objective is achieved by the following invention as it is defined in the claims.

In order to obtain a durable, elastic material, a reactive monomer dissolved or dispersed in water-glass is desirable, which is reactive with respect to isocyanate. In order to obtain thixotropic properties it is necessary to increase the rate of reaction to such an extent that if possible a gel-like condition is reached instantaneously, which prevents the reaction mixture from running out of a bore hole in overhead working. Surprisingly, it has now been found that in contrast to the usual polyoles, primary and secondary di and preferably trifunctional poly-oxy-alkylene amine can be dispersed in water-glass without swelling up (gelatinization). If, as is defined in the claims, one reacts this water-glass mixed with poly-oxy-alkylene amine with isocyanate and/or prepolymers then one will obtain homogeneous substances which will gelatinize instantaneously so that within the space of about 2 minutes a pudding like product is obtained into which an anchor can be set. It is assumed that the rates of reaction of the poly-oxy-alkylene amine on the one hand and of the water-glass on the other hand with the poly-isocyanate component are almost the same. The hardening which follows thereupon leads to a high strength elastic inflammable product.

The raw materials which are necessary for the manufacture of the substances according to the invention are described in detail in the following.

The compounds employed in the invention having terminal amino groups in which at least one free hydrogen atom on at least one amino group and at least one alkylene group interrupted by oxygen, nitrogen and/or sulphur atom are present are for example polyoxyalkylene amine or polyalkylene polyamine. These materials in addition to the oxygen and/or sulphur atoms which interrupt the alkylene groups may also contain nitrogen atoms.

The polyoxyalkylene amines which are employed in the invention have at their disposal a polyoxyalkylene chain and one or more terminal amino groups which exhibit at least one free hydrogen atom in the amino group. Polyoxyalkylene amines are preferred selected from compounds having the formula

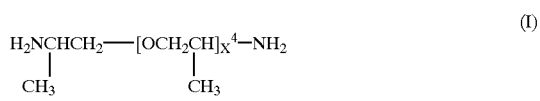

(I)

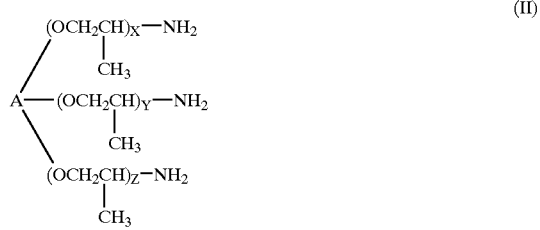

(II)

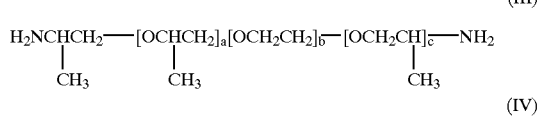

(III)

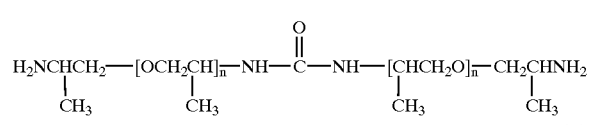

(IV)

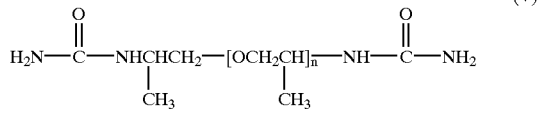

(V)

-continued

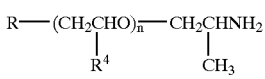
(VI)

in which R, signifies $CH_3OCH_2CH_2O$, R' signifies hydrogen or an alkyl residue with 1 to 4 carbon atoms, A signifies the residue of a trivalent alcohol, preferably trimethylol propane or glycerine. x' signifies a number from 2 to 70, b signifies a number from 5 to 160, the sum of the numbers a+c represents a value of from 2 to 4, n represents a value of from 4 to 80, x, y or z represent a value of from 1 to 100 or mixtures thereof.

Formula II compounds are preferred in particular.

The poly-oxy-alkylene amines quoted above are known commercially by the trade name Jeffamine®.

Products which can be used according to formula I are Jeffamine® D-230, D-400, D-2000 or D-4000. Products according to formula II are Jeffamine® T-403, T-3000 and T-5000. Products according to formula III are Jeffamine® ED-600, ED.900, ED-2001, ED-4000 or ED-6000. Products according to formula IV are Jeffamine® DU-700 or DU-3000. Products according to formula V are for example Jeffamine® BuD-2000 and similar. Products according to formula VI are Jeffamine® M-600, M-1000, M-2005 or M-2070.

Secondary poly-oxy-alkylene amines for example are compounds in the Novamine® series.

Molecular weights of from 100 to 10 000 g/Mol are usable, the range from 400 to 6000 is preferred, particularly preferred are 200 to 5000, e.g. about 400 to 1000 or 4000 to 5000 or 1000 to 3000 g/Mol.

For the above and the following compounds with terminal amino groups which are used according to the invention it holds good that for a shorter length of chain and/or a lower molecular weight the catalytic properties are increased and the elasticity is reduced.

Polyoxyalkylenes where at least one amino group exhibiting a free hydrogen atom forms a part of an urea, guanidine, basic hetero cyclus such as Imidazol, Piperidin etc. may also be used. An example for this is the Jeffamine® BuD-2000 mentioned above.

Accordingly by the expression compounds having terminal amino groups all those compounds are to be understood in which at least one group containing nitrogen is linked to the end of the molecule in which at least one reactive i.e. free hydrogen atom is linked to a nitrogen atom.

Examples for polyalkylene amines are compounds having the formula

in which R signifies an alkylene residue having 2 to 5 carbon atoms and n signifies a number of 1 to 50 or having the formula

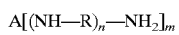

in which R and n have the above meanings, A signifies a hydrocarbon residue and m signifies a number of 3 to 20. Diethylene triamine, triethylene tetramine and tetraethylene pentamine are preferred. Diethylene triamine is particularly preferred.

The alkali silicate solutions which are commonly used in this sector of the trade can be employed for the manufacture of the organo-mineral system according to the invention Aqueous solutions of sodium and potassium water-glasses may be used from 28 to 60° B, having a Mol ratio of $Na_2O$ to $SiO_2$ or $K_2O$ to $SiO_2$ of 1:4 and a dry solids content of 35 to 60 wt %. The densities of water-glass solutions are reported in ° B. Henceforth $Na_2O$ or $K_2O$ are designated generally as $Me_2O$.

The employed water-glass solutions which are preferred according to the invention are colourless, clear as water and more or less viscous aqueous solutions of sodium and/or potassium silicates with a ratio of $SiO_2$ to $Me_2O \geq 2$.

Apart from $H_4SiO_4$ molecules, the presence of Me—OH⁻ and $H_3SiO^+$ ions is to be assumed in the water-glass solutions. The catalysis of the $H_4SiO_4$ molecules into linear chains and three dimensional networks is accompanied by the expulsion of water and is responsible for the viscosity of the water-glass solution.

The sodium and potassium silicate solutions which are shown in the table below and which are available commercially belong inter alia to the water-glass solutions employed according to the invention.

| | ° Bé | Weight.- % $Na_2O$ | and/ or $K_2O$ | Weight.- % $SiO_2$ | $^PH$ 20° | Viscosity 20° cp |
|---|---|---|---|---|---|---|
| High silica glass | 35 | 7.0 | — | 26.1 | 10.8 | ~200 |
| "Water-glass" 37 to 40° Bé (German) | 38 | 7.7 | — | 25.8 | 11.2 | ~60 |
| "Water-glass" 41° Bé (American) | 41 | 9.0 | — | 28.7 | 11.3 | ~200 |
| Alkai soda glass 58–60° Bé | 59 | 18.0 | — | 36.0 | 12.2 | ~60000 |
| Glass having a ratio of 1.6 American | — | 19.7 | — | 31.4 | — | ~7000 |
| Potassium glass 28–30° Bé | 30 | — | 8.2 | 21.2 | 11.3 | ~50 |
| Potassium glass 41° Bé | 41 | — | 12.8 | 26.9 | 11.6 | ~1000 (25° C.) |

Sodium water-glasses are preferred because they are more easily available and have a lower viscosity.

The employment is preferred of sodium water-glasses with a relatively high solids content, which lies advantageously in the range of about 40 to 60 and in particular about 42 to 52 wt. % of inorganic solids. Potassium water-glasses however are also advantageous with a solids content of 25 to 40 wt. %. More highly concentrated water-glass solutions are also feasible and can be employed within the meaning of the invention. In this case however high viscosities must be taken into account. Furthermore, mixtures of sodium and potassium water-glasses may be employed.

The Mol ratio of $SiO_2$ to $Me_2O$ in the water-glass solutions which are employed is preferably relatively high and lies advantageously in the range of about 2 to about 5. Particularly preferred is a range of about 2.48 to 4.45, in particular 2.70 to 2.95 but also 4.0 to 4.30.

The formation of three dimensional inorganic silica structures is promoted by a $Me_2O$ content within the ranges reported above. The composition and the quantity of water-glass to be used must be taken into account when determining the quantity of catalyst in order to achieve a product with optimum strength. Organo-mineral products with excellent flexural tensile strength are achieved according to the invention in particular if the polyisocyanate and the water-glass solution are employed in a Mol ratio NCO to $SiO_2$ of 0.8 to 1.4, preferably from 0.85 to 1.15. Especially preferred is a Mol ratio NCO to $SiO_2$ of about 1.0. The use of concentrated water-glass solutions is preferred in order to avoid products of high water content which would affect their long term strength properties in a negative manner. The lower limit of the water-glass fraction is given by the fact that its amount must be sufficient to build up the inorganic structure. For this purpose there are at least 0.2 and preferably at least about 0.5 parts by weight of water-glass necessary per one part by weight of polyisocyanate. Just as in the case of a water content which is too high a complete hardening is then no longer possible. The upper limit of water-glass content is for example about 1.6 to about 1.7 parts by weight of water-glass per one part by weight of polyisocyanate when sodium water-glass 48/15 having a Mol ratio of $SiO_2/Me_2O$ of about 2.85 is used.

For the manufacture of organo-mineral systems according to the invention, polyisocyanates can be employed which are commonly used in the specialised sector of polyurethane manufacture. To this group belong such isocyanate compounds which have at least two isocyanate groups. Preferably, mixtures of isocyanates are employed which predominantly include quantities of polyisocyanate compounds having at least three isocyanate groups. Examples thereof are the commercially obtainable products Desmodur 44V and Papi. Mixtures of polyisocyanate in which almost no diisocyanates and monoisocyanates are contained belong to those mixtures of polyisocyanate which are especially preferred. An organic polyisocyanate mixture which is obtained by the phosgenation of raw aniline formaldehyde resins which contains predominant amounts of the diphenyl methane diisocyanate isomers and higher functional polyisocyanates with more than 2 benzole rings in the molecule are separated in this method into the diphenyl methane diisocyanate isomer and the higher functional polyisocyanates.

To suitable organic diisocyanates there belong for example aliphatic diisocyanates, aromatic diisocyanates, alicyclic diisocyanates and heterocyclic diisocyanates, for example methylene diisocyanate (MDI), ethylene diisocyanate (EDI), propylene diisocyanate (PDI), butylene diisocyanate (BDI), cyclo-hexylene-1,4-diisocyanate, cyclo-hexylene-1,2-diisocyanate, tetra and hexa-methylene diisocyanate, arylene diisocyanates or their alkylation products such as the phenylene diisocyanates, naphthylene diisocyanates, diphenyl-methane diisocyanates, toluylene diisocyanates, di or triisopropyl-benzole diisocyanates, aralkyl diisocyanates such as dixylylene diisocyanates, fluorine substituted isocyanates, ethylene glycol diphenyl ether 2,2'-diisocyanate, naphthalene-1,4-diisocyante, naphthalene-1,1'-diisocyanate, biphenyl-1-2,4'-diisocyanate, biphenyl-4,4'-diisocyanate, benzophenone-3,3'-diisocyanate, fluorine-2,7-diisocyanate, anthrachinon-2,6-diisocyante, pyrene-3,8-diisocyante, chrysen-2,8-diisocyanate, 3'-methoxyhexane-diisocyanate, octane-diisocyanate, ω,ω'-diisocyanate-1,4-diethyl benzole, ω,ω'-diisocyanate-1,4-dimethylnaphthaline, cyclohexane-1,3-diisocyanate, 1-isopropyl-benzole-2,4-diisocyanate, 1-chlorobenzole-2,4-diisocyanate, 1-fluorobenzole-2,4-diisocyanate, 1-nitrobenzole-2,4-diisocyanate, 1-chloro-4-methoxy-benzole-2,5-diisocyanate, benzoleazo-naphthaline-4,4'-diisocyanate, diphenylether-2,4-diisocyanate, diphenylether-4,4-diisocyanate and isocyanurate groups containing polyisocyanates.

Of these, crude MDI with an NCO content of about 31% and modified crude MDI with a proportion of NCO of about 30% are preferred.

According to the invention, NCO pre-adducts such as are used in the manufacture of polyurethane can also be employed. In the case of NCO pre-adducts it is a question of high molecular compounds having at least two terminal NCO groups which preferably exhibit a molecular weight of 500 to 10,000, especially 800 to 2,500. These pre-adducts preferably exhibit an NCO group content of 1.5 to about 30%, whereby 17 to 25% is preferred. The manufacture of these NCO pre-adducts takes place in known manner by the decomposition of compounds containing high molecular OH groups with an excess of polyisocyanate.

Among suitable compounds containing high molecular OH groups which are suitable for the manufacture of NCO pre-adducts there are mentioned polyester, polyether, polyester amide, polythioether, and polyacetal. For example, linear hydroxyl polyesters which contain terminal hydroxyl groups and which have been obtained either by the poly condensation of ε-caprolacton or 6-hydroxycapronic acid or by the co-polymerization of ε-caprolactam with divalent alcohols or by the polycondensation of dicarbonic acid with divalent alcohols may be employed as polyoles for the manufacture of NCO pre-adducts.

The hydroxypolyesters which are employed for the manufacture of the NCO pre-adducts may also be manufactured from dicarbonic acids or mixtures of dicarbonic acids with divalent alcohols. As an example, adipin acid, bernstein acid, cork acid, sebacin acid, oxalic acid, methyladipin acid, glutar acid, pimelin acid, azelain acid, phthalic acid, terephthalic acid, isophthalic acid, maleic acid, fumar acid, citracon acid, itacon acid belong to the suitable dicarbonic acids. For example ethylene glycol, propylene glycol, butylene glycol, for example 1.4-butane diol; butene diol, butyne diol, Bis-(hydroxy methyl cyclohexane), diethylene glycol, 2.2 dimethylpropylene glycol, 1.3-propylene glycol belong to the suitable divalent alcohols or their mixtures which are decomposed with the dicarbonic acids or with ε-caprolacton into the desired hydroxy polyesters.

To the preferred polyoles which are employed for the manufacture of the NCO pre-adducts belong the polyesters based on adipin acid, 1.6-hexane diol and neopentyl glycol with an average molecular weight of 2,000 and polyether, in particular poly-ether diol with an average molecular weight of 2,000.

Furthermore high molecular compounds with terminal carboxyl, amino and mercapto groups are also suitable. Polysiloxane which exhibit groups capable of reaction with respect to isocyanates are also mentioned.

Polyether diols are preferred whereby in particular polyether diols with an OH number of about 56 are preferred.

Polymerizers can also be employed in the substances according to the invention. These are multi-functional reactive compounds against isocyanate. In particular they are a sugar such as sorbit or saccharose or a branched polyol such as trimethylol propane, glycerin or pentaerythrite.

A special example is 4.4'-diphenylmethane diisocyanate (also known in the form of the phosgenated product of aniline formaldehyde concentrates, crude MDI). A decomposition product of crude MDI with glycol started polysiloxane having an OH number of 40 to 200 is suitable as a pre-polymeride Polyisocyanates which are employed according to the invention preferably have a content of NCO groups of about 10 to 55% based on the weight of the polyisocyanates. Especially preferred are polyisocyanates with an NCO group content of 24 to 36, in particular 28 to 32 wt. %.

A further component which is necessary for the manufacture of the substances according to the invention is a catalyst which has the capacity to catalyse the trimerization of the polyisocyanate components. Trimerization catalysts known from polyurethane chemistry are suitable which are preferably tertiary amines and amino-alcohols. Special examples for suitable trimerization catalysts are 2,4,6-tris (dimethyl-aminomethyl)-phenol as well as other mannich base products having the element of structure

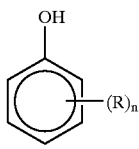

in which R signifies a residue, n has a value of 1 to 3 and the residues R are located in the o or the p position. The residues $R_1$ and $R_2$ can be the same or different and signify, $C_{1-4}$ alkyl residues preferably methyl groups or $C_{1-4}$ hydroxy-alkyl residues, preferably hydroxy-methyl groups.

Mixtures of the above named catalysts can of course also be employed.

Additional suitable catalysts are catalysts chosen from methyl-diethanolamine, N-methyl-dipropyldiamine, N-butyl-aminoethanol, dimethyl-amino-2-propanol, diethyl-aminoethoxy ethanol and o-tolyl-propanolamine. Further suitable catalysts include 1.4-diaza (2,2,2) bicyclo-octane, (DABCO®, also described as tri-ethylene-diamine), N,N'-Bis-dimethyl-diethyl-piperazine, hexa-methyl-triethylene-tertramine, dimethyl-benzyl-amine, dimethyl-acetylamine, 1.8-diazo-bicyclo[5,4,0] undecen (7), tetramethyl-1.3-butane-diamine. Preferably however, one employs the catalysts having the tertiary amine groups, preferably the compounds mentioned above 2,4,6-tris (dimethyl-amino-methyl)phenol or dimethyl-benzyl-amine. The mole ratio of catalyst to NCO groups in the reaction mixture is important for the manufacture of the substances according to the invention and must be adjusted taking account of the following points of view.

a) The quantity of catalyst must be sufficient in order to catalyse the reaction which is necessary for building up the organic framework,
 b) The quantity of catalyst must not be so great that an uncontrolled strongly exothermic reaction is set off, because with the heavy evolution of $CO_2$ and without the evaporation of water this would lead to foaming of the reaction mixture and to products having insufficient strength.

For the usual preferred composition according to the invention and the quantity of water-glass solution used, the relationship of catalyst to NCO group in the reaction mixture amounts to 6.0 to 14.5, preferably 8.5 to 13.8 and in particular 10.2 to 13.3 mmole of catalyst per Mol of NCO group.

A co-catalyst may be employed in order further to control the trimerization reaction. This may consist for example of a trivalent iron compound such as $FeCl_3$ which, because of production requirements, is frequently to be found in the various commercial polyisocyanates. Of course the other co-catalysts which are known as such may also be used for example trialkyl-phosphanes, such as trimethyl-phospholine, the alkali metal salts of carbonic acids such as sodium acetate or sodium maleate or metal decomposition compounds such as $Sb_{2O3}$, $ZrOCl_2$, $SbCl_2$ or CuCl. Furthermore in addition one may use organo-metal compounds such as for example dibutyl-tin-dilaurate, dibutyl-tin diacetate, tin-2-octoate, dibutyl-tin-dioctoate and di-n-butyl-tin-carboxylate.

Substances having particularly advantageous physical properties are obtained according to the invention if poly- isocyanate and water-glass are employed in such amounts and having such compositions, that the preferred relationship which has been explained is formed between the quantity of catalyst to NCO groups, together with the preferred relationship between $NCO/SiO_2$ which has also been explained and in addition that the catalyst is present in such an amount that the quantity of $CO_2$ which is developed is just sufficient for the complete precipitation of the $Me_2O$ portion of the water-glass.

The preferred conditions for the manufacture of the substances are a quantity of catalyst of preferably 6.0 to 14.5, more preferably 8.5 to 13.8 and in particular 10.2 to 13.3 mmole per mole NCO groups, the employment of the polyisocyanate and of the alkali silicate solution in a Mol relationship of $NCO/SiO_2$ of 0.8 to 1.4, preferably 0.85 to 1.15, a Mol quantity of reaction masses (i.e. all compounds which exhibit the groups—OH, —NH2, —NRH and/or $H_2O$) of preferably 2.0 to 4.0, more preferably 2.5 to 3.8 but also 2.9 to 3.8, a Mol relationship of amino groups of for example poly-oxy-alkylene-amine to an alkali oxide $Me_2O$ of 0.01 to 1, preferably 0.01 to 0.4, but also 0.01 to 0.3 and/or 0.2 to 0.4, an index defined as Index=100. NCO/OH, in the range of 10 to 30, preferably 11 to 25, but also 10 to 20 or 14 to 22, a portion of —NCO (absolute) in the range of 0.1 to 2.0 preferably 0.3 to 1.0 Mol, more preferably 0.4 to 0.7 Mol but also 0.1 to 0.7 Mol, as well as 0.6 to 1.8 Mol, a portion of an alkali oxide $Me_2O$ (whereby apart from Na and K, Me may also comprise Li, Cs and Rb), in the range 0.01 to 2, preferably 0.05 to 0.2 but also 0.01 to 0.1 or 0.2 to 0.5 or 0.1 to 1, a portion of amine from polyamine (absolute) of 0.001 to 0.1, preferably 0.002 to 0.05, but also 0.001 to 0.02 or 0.01 to 0.08 Mol, a Mol relationship —NCO to $Me_2O$ in the range 1 to 15, preferably 2 to 9 but also 1 to 6 or 5 to 12 and a Mol relationship of —NCO to amine of 5 to 500, especially 10 to 300, but also 11 to 80 or 100 to 400.

The water-glass shall exhibit the normal preferred composition i.e. a Mol relationship $SiO_2/Me_2O$ as has previously been defined.

For the decomposition of the polycyanate and the water-glass solution, the uniform distribution of the catalyst in the reaction mixture is desirable for the manufacture of high grade substances according to the invention. The catalyst is most usefully added to the water-glass solution.

Fundamentally, the addition of a blowing agent to the reaction mixture is not necessary, for the manufacture of the preferred substances of the invention. However, according to the exact recipe formulation and the other reaction conditions an exactly metered small quantity of a blowing agent may be added which however is not sufficient to cause the expansion of the product during polymerisation.

Volatile substances which are liquid at room temperature are suitable for this purpose; they volatilise during the decomposition of the water-glass with the polycyanate as the result of the heat which is then liberated. Examples of suitable volatile substances are the known FCKW free blowing agents that is not halogenated blowing agents which damage the ozone layer.

The added quantity of volatile substance amounts preferably to a maximum of 3.5 wt. % based on the total quantity of the reaction mixture. Preferred particularly is a content in the reaction mixture of 1 to 2.8 wt. % of volatile material. Such a small addition does not cause any expansion (foaming) of the product during decomposition. Rather, the volatile material escapes from the reaction mixture almost completely during the beginning phase of the decomposition and as a result leaves behind individual cavities and channels which remain in the reaction mixture and which can absorb alkali carbonate solution. This mechanism contributes to the mechanical strength of the resulting product.

Nucleus formers and stabilising materials can also be added to the reaction mixture. Suitable materials which form nuclei for example are finely divided solids such as silica and alumina if necessary together with zinc stearate or amorphous silica or metal silicates. Of these the silica which is precipitated from the colloidal water-glass solution is preferred as a nucleus former.

Suitable stabilisers are silicone oils based on polysiloxanes. They may be added in an amount of about 0.5 to 2, especially 0.8 to 1.4 wt. % based on the total weight of the reaction mixture.

According to the desired properties of the organo-mineral systems, yet further additions may be incorporated into the reaction mixture. For example organic compounds belong to these which possess residues capable of reacting with respect to the isocyanate groups. Examples are polyoles such as polyester and polyether-polyoles as well as phosphonate esters, e.g. tri-β-chlorethyl- or -isopropyl-phosphonate, which are known in polyurethane chemistry. The quantity of the polyoles should be limited so that their addition does not interfere with the formation of a three dimensional organic frame work and the inorganic framework which is interwoven therewith. Advantageously the addition of polyol or phosphonate-ester is limited to at most 2 to 45, preferably 10 to 20 wt. % based on the isocyanate component.

To reduce the inflammability of the organo-mineral products of the invention, flame inhibiting materials may be added to the reaction mixture. Suitable for this purpose are those flame inhibiting or flame retarding materials such as phosphates and borates which are known from the chemistry of synthetic resins. The quantity of flame inhibiting materials can lie in the range of 2 to 30 wt. %, based on the isocyanate components. Preferred flame inhibiting means are halogenated phosphoric acid esters. Especially preferred is a trichlor-propyl-phosphate.

Other additional filler materials may be added to the reaction mixture, which have a further effect on strengthening the product. Examples for such fillers are diatomaceous earth, aluminium oxy-hydrate, magnesium silicate, chalk and glass fibres. The quantity of added fillers is determined first of all by the viscosity of the mixture. The quantity lies preferably within the range of 0.1 to 30 wt. % based on the weight of the water-glass solution which has been employed.

To manufacture the substances according to the invention preferably two components A and B are produced first of all. Component A comprises the water-glass solution and contains in addition the compound with the terminal amino groups, as well as the catalyst and, if appropriate a compound which contains the catalyst in a dispersed form. Component B comprises the polyisocyanate or pre-adduct and/or prepolymerizate and contains if appropriate the co-catalyst as well as if appropriate the volatile material and the stabiliser as well as flame inhibiting additions. Fillers and colouring agents may be employed in any desired manner just as well in component A as in component B.

To manufacture the substances according to the invention components A and B are carefully mixed together. Preferably this takes place with a two component mixing device, with which subsequently the resulting mixture can be filled into the cavities which have been provided. In general the setting time of the mixture which is obtained lies between 5 and more than 100 seconds and may be controlled according to wish. If appropriate, the components or the mixture may be warmed or cooled in order to make the setting time fit the requirements.

As has been mentioned in the above, first of all a gel-like product is obtained which hardens after 2 minutes.

The decomposition of the mixture starts with the reaction of the NCO groups with the water of the water-glass solution and with the amino groups of the compound containing the terminal amino groups. An organo-mineral system and gaseous $CO_2$ result thereby. The transformation is exothermic. The liberated heat leads on the one hand to the volatilisation of the volatile material and on the other hand to the trimerization of residual NCO groups under the effect of the catalyst. The liberated $CO_2$ in its turn reacts with the $Me_2O$ of the water-glass to form alkali metal carbonate. As a result the $Me_2O$ component is extracted from the water-glass. During the course of the decomposition, the remaining silica components form a three dimensional inorganic framework which combines with the organic polymeride, which is formed at the same tome, to produce a mutually penetrating network of great strength. The residual alkali carbonate solution in the channels left by the evaporated volatile material contributes to increasing the strength.

Because of their outstanding properties especially because of their high strength, elastic and fire resistant properties and because of their quasi thixotropic properties during processing, the substances according to the invention are outstandingly suited for filling in bore holes, especially when working overhead, as well as for fixing anchors.

The examples will illustrate the invention.

EXAMPLE 1

A reaction component A is produced which contains the following materials with the amounts reported in wt. %:

| | |
|---|---|
| Sodium Water-glass 48/50 | 88.7 |
| Water | 4.3 |
| 2.4,6-Tris-(dimethyl-amino-methyl)-phenol | 0.5 |
| Jeffamine T-403 | 6.5 |

Separately therefrom reaction component B is produced with the following constituents:

| | |
|---|---|
| Crude MDI NCO 31%, 250 mPas | 98 |
| Polyether-siloxane-block co-polymer | 2 |

The relationship of grams A component to grams B component is 100:87.

During the mixing of the two reaction components, the substance reacts spontaneously and is transformed at once into a gel-like quasi thixotropic condition. The substance remains mouldable for up to 3 minutes. It is possible to spray this substance overhead without it falling down. It is thus suitable for filling in bore holes and for the agglutination of anchors. After about 5 to 10 minutes a solid material arises.

EXAMPLE 2

The same procedure is followed as in example 1 with the difference that instead of Jeffamine T-403, the same quantity of Jeffamine T-5000 is used.

A substance having similar processing properties and similar finished product properties as in example 1 is obtained.

EXAMPLE 3

The same procedure is followed as in example 2 with the difference that instead of Jeffamine T-5000 the same quantity of Jeffamine D-2000 is used. Apart from this 0.3 parts by weight of dimethyl-benzyl-amine are added additionally as catalyst A substance having similar processing properties and similar finished product properties as in example 2 is obtained.

EXAMPLE 4

The same procedure as was followed in example 3 is repeated with the difference that in place of Jeffamine D-2000, secondary poly-oxy-alkylene amine having a molecular weight of 6000 is employed A substance having similar processing properties and similar finished product properties is obtained.

EXAMPLE 5

Example 1 is repeated with the difference that the following B component is employed:

| | |
|---|---|
| Crude MDI NCO 31%, 250 mPas | 40.3 |
| modified crude MDI NCO 30%, 170 mPas | 40.3 |
| Poly-ether-siloxane-block co-polymer | 1.7 |
| Poly-ether-diole OHZ 56 | 17.7 |

To 100 g A component are added 79 g B component,

The substance exhibits similar processing properties as in example 1 and similar properties for the finished product.

EXAMPLE 6

Example 2 is repeated with the difference that as the B component the B component described in example 5 and the relationship of component A to component B which is also described there is employed.

A substance having similar processing properties and similar properties for the finished product is obtained.

EXAMPLE 7

Example 3 is repeated with the difference that as the B component the B component described in example 5 is used and the relationship of component A to component B which is also described there is employed.

A substance having similar processing properties and similar properties for the finished product as in example 3 is obtained.

EXAMPLE 8

Example 4 is repeated with the difference that as the B component the B component described in example 5 is used and the relationship of component A to component B which is also described there is employed.

A substance having similar processing properties and similar properties for the finished product as in example 4 is obtained.

EXAMPLE 9

A reaction component A is produced which contains the following materials with the amounts reported in wt. %:

| | |
|---|---|
| Potassium Water-glass 28/30 | 88.7 |
| Water | 4.3 |
| Dimethyl-benzyl-amine | 0.3 |
| 2.4,6-Tris-(dimethyl-amino-methyl)-phenol | 0.5 |
| Jeffamine T-403 | 6.5 |

Translator's Note: These are not Percentages!!

Separately therefrom reaction component B is produced with the following constituents:

| | |
|---|---|
| Crude MDI NCO 31%, 250 mPas | 98 |
| Polyether-siloxane-block co-polymer | 2 |

The relationship of grams A component to grams B component is 100:87.

A substance having similar processing properties and similar properties for the finished product as has been previously described is obtained.

EXAMPLE 10

Example 9 is repeated with the difference that as component B the composition of component B from example 5 is used and the corresponding relationship of A component to B component is employed.

A substance having similar processing properties and similar properties for the finished product as has previously been described, is obtained.

EXAMPLE 11

A reaction component A is produced which contains the following materials with the amounts reported in wt. %:

| | |
|---|---|
| Sodium Water-glass | 88.7 |
| Water | 4.3 |
| Dimethyl-benzyl-amine | 0.3 |
| 2.4,6-Tris-(dimethyl-amino-methyl)-phenol | 0.5 |
| Jeffamine T-403 | 6.5 |

Translator's Note: These are not Percentages!!

Separately therefrom reaction component B is produced with the following constituents:

| | |
|---|---|
| Crude MDI NCO 31%, 250 mPas | 98 |
| Polyether-siloxane-block co-polymer | 2 |

The relationship of grams A component to grams B component is 100:87

A substance having similar processing properties and similar properties for the finished product as has been previously described is obtained.

EXAMPLE 12

Example 11 is repeated with the difference that to component B additionally 10 parts by weight of trichlor-propyl-phosphate are added.

A substance having similar processing properties and similar properties for the finished product as has been previously described is obtained.

EXAMPLE 13

Example 11 is repeated with the difference that the following composition is employed as component B:

| | |
|---|---|
| Crude MDI NCO 31% 250 mPas | 40.3 |
| modified crude MDI NCO 30%, 170 mPas | 40.3 |
| poly-ether-siloxane-block co-polymer | 1.7 |
| propylene carbonate | 10 |
| poly-ether-diole OHZ 56 | 17.7 |

The relationship of grams A component to grams B component is 100:87.

A substance having similar processing properties and similar properties for the finished product as has been previously described is obtained.

EXAMPLE 14

A reaction component A is produced which contains the following materials with the amounts reported in wt. %:

| | |
|---|---|
| Sodium Water-glass 48/50 | 88.7 |
| Water | 4.3 |
| 2,4,6-Tris-(dimethyl-amino-methyl)-phenol | 0.5 |
| Diethylene-triamine | 2.5 |

Translator's Note: These are not Percentages!!

Separately therefrom reaction component B is produced with the following constituents:

| | |
|---|---|
| Crude MDI NCO 31%, 250 mPas | 98 |
| Polyether-siloxane-block co-polymer | 2 |

The relationship of grams A component to grams B component amounts to 100:87

COMPARATIVE EXAMPLE 1

A reaction component A is produced which contains the following materials with the amounts reported in wt. %:

| | |
|---|---|
| Sodium Water-glass 48/50 | 88.7 |
| Water | 4.3 |
| Dimethyl-benzyl-amine | 0.3 |
| 2.4,6-Tris-(dimethyl-amino-methyl)-phenol | 0.3 |

Translator's Note: These are not Percentages!!

Separately therefrom as the B component the B component described for example 5 is produced.

For 100 g of component A 79 g of component B were employed The substance hardened so quickly that the insertion of anchors after 1 to 3 minutes is no longer possible in contrast to the examples according to the invention.

What is claimed is:

1. A method for the manufacture of elastic, fire resistant organo-mineral systems based on waterglass, which method comprises the steps of:

(A) providing component A which comprises waterglass and a compound containing terminal amino groups, wherein said compound is a polyoxyalkylene polyamine or mixture of different polyoxyalkylene polyamines, (B) providing component B which comprises a polyisocyanate or a polyisocyanate prepolymer, (C) mixing component A with component B in the presence of a catalyst for the trimerization of polyisocyanate, and (D) allowing the mixture to react and form a gel which can be immediately sprayed overhead without falling down.

2. A method according to claim 1, wherein the ratio by weight of component A to component B is from 1:2 to 2:1.

3. A method according to claim 1, wherein the compound having terminal amino groups has a molecular mass of from 800 to 10,000 g/Mol.

4. A method according to claim 1, wherein the ratio of NCO/OH is less than 2.

5. A method according to claim 1, wherein the trimerisation catalyst is dispersed in component A.

6. A method according to claim 5, wherein a mixture of two or more trimerisation catalysts is present.

7. A method according to claim 5, wherein the quantity of catalyst is sufficient to catalyse the reaction to build up an organic framework but not so great that foaming of the reaction mixture is caused to occur.

8. A method according to claim 1, wherein the polyoxyalkylene polyamine is a trifunctional polyoxyalkylene polyamine.

9. A method according to claim 1, wherein the polyoxyalkylene polyamine includes a polyoxyalkylene polyamine containing primaary amino groups.

* * * * *